United States Patent

[11] 3,558,087

| | | |
|---|---|---|
| [72] | Inventor | David T. Barish<br>New York, N.Y. |
| [21] | Appl. No. | 826,784 |
| [22] | Filed | May 22, 1969 |
| [45] | Patented | Jan. 26, 1971 |
| [73] | Assignee | Barish Associates, Inc.<br>New York, N.Y.<br>Continuation-in-part of application Ser. No. 618,888, Feb. 27, 1967, now Patent No. 3,480,238. |

[54] PARACHUTE
21 Claims, 15 Drawing Figs.

[52] U.S. Cl. ................................................ 244/142
[51] Int. Cl. ..................................................... B64d 17/02
[50] Field of Search ........................................... 244/146, 145, 142, 138, FW Digest, 49, 43

[56] References Cited
UNITED STATES PATENTS

| 2,759,694 | 8/1956 | Lemoigne | 244/146(X) |
| 3,104,857 | 9/1963 | Knacke et al. | 244/145 |

FOREIGN PATENTS

| 1,075,314 | 7/1967 | Great Britain | 244/142 |

Primary Examiner—Milton Buchler
Assistant Examiner—James E. Pittenger
Attorney—Burgess, Dinklage and Sprung ABSTRACT: A flexible clothlike airfoil-shaped parachute capable of glide and soar which has a canopy made of a clothlike material which is limp and non-self-supporting in the uninflated (not in flight) condition, which parachute canopy has a leading edge and a trailing edge and suspension lines depending from said canopy sufficient to support a load. The leading edge of the canopy is of a clothlike material, arcuate in cross section and may be made up of a portion of the canopy which is folded back and affixed to the remaining canopy to form a three-dimensional, generally airfoil shape, or a section thereof. This airfoil shape has apertures in the arcuate leading edge thereof which permit air to enter into the space formed between the folded and affixed flap, the leading edge and the remainder of the canopy while such canopy is in flight.

PATENTED JAN 26 1971
3,558,087
SHEET 1 OF 2
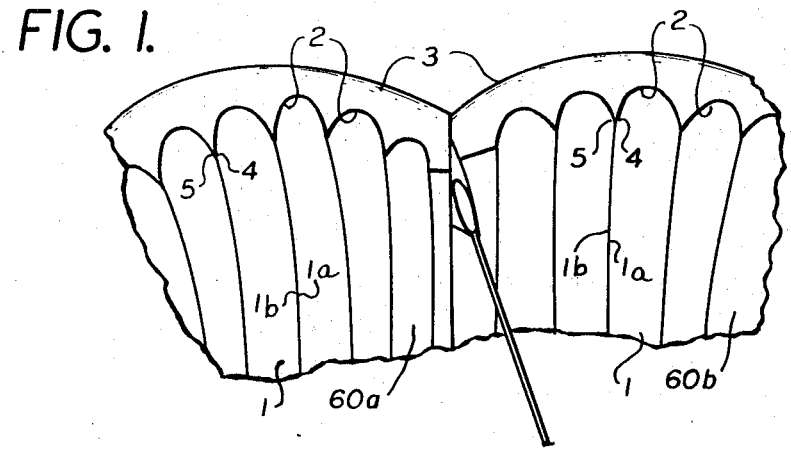
FIG. 1.
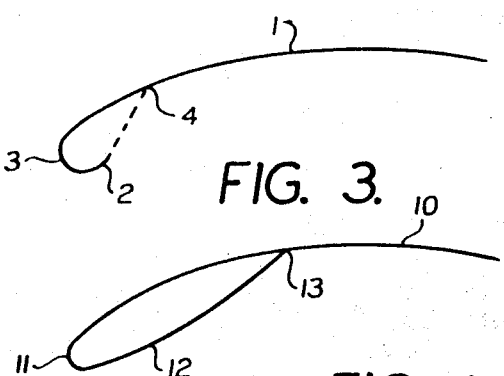 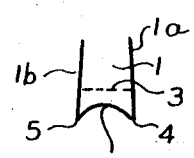
FIG. 2.   FIG. 2a.
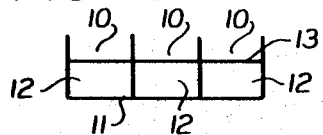
FIG. 3.   FIG. 3a.
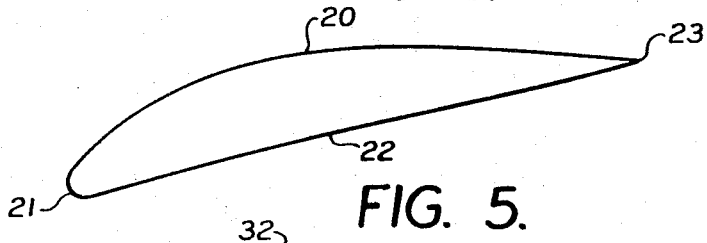 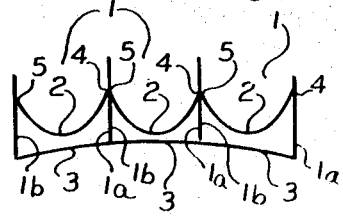
FIG. 4.   FIG. 8.
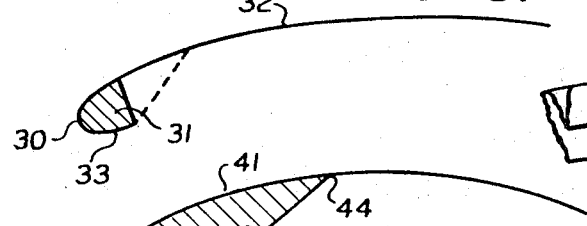 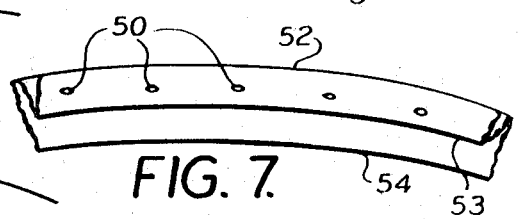
FIG. 5.   FIG. 7.
FIG. 6.
INVENTOR
DAVID T. BARISH
ATTORNEYS PATENTED JAN 26 1971 3,558,087
SHEET 2 OF 2
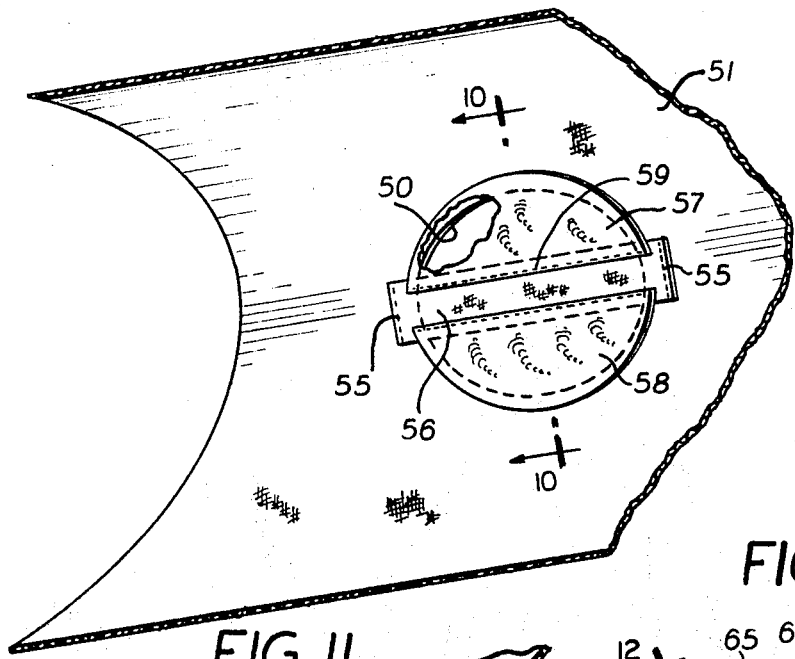
FIG. 9.
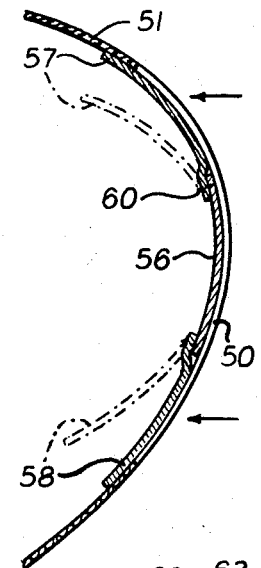
FIG. 10.
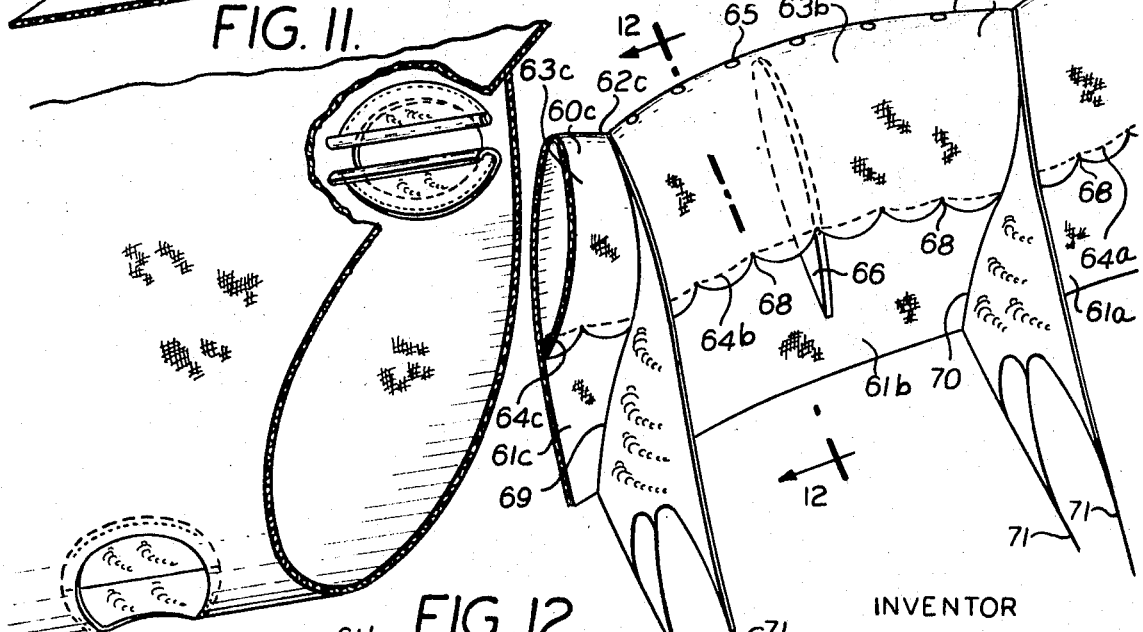
FIG. 11.
FIG. 13.
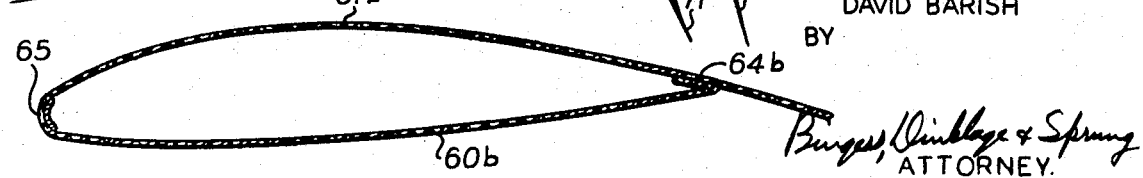
FIG. 12.
INVENTOR
DAVID BARISH
BY
Burgess, Dinklage & Sprung
ATTORNEY.

PARACHUTE

This application is a continuation in part of application Ser. No. 618,888, filed Feb. 27, 1967, now U.S. Pat. No. 3,480,238.

In a particularly preferred embodiment, there are provided flaps hingedly connected across the inside of these apertures which act as one-way valves so as to permit air to pass into the area enclosed by the arcuate leading edge as aforesaid, but will inhibit the escape of air out of this area.

In another embodiment additional flapped apertures (one-way valves) are provided in the airfoil structure, preferably at or near the place where the folded back flap meets and is attached to the remainder of the canopy curved surface which serves to "cushion" the fall and thereby slow the rate of descent.

It is an object of this invention to provide improved parachute constructions.

It is another object of this invention to provide a flexible wing glide device having greater stability and controllability than has been possible in the past.

Other and additional objects of the this invention will become apparent from a consideration of this entire specification, including the claims and drawing appended hereto.

In accord with, and fulfilling these objects, one aspect of this invention resides in a flexible glide wing parachute made up of at least one module which comprises a chambered canopy, an arcuate leading edge, and a folded-back portion extending from the leading edge backward attached to the canopy forming an airfoil. Suspension or load lines depend from the canopy including other than the leading edge thereof. The components of the glide wing parachute of this invention are limp, clothlike material. The material is foldable and is nonself supporting except in the glide wing parachute shape and airborne. The leading edge of at least one module of the glidewing of this invention is arcuate in cross section. The glidewing of this invention is collapsible and foldable into an extremely compact form sufficient to be insertable into a pack which can be carried by a parachutist. When the parachutist leaves an airplane or other airborne vehicle, the glidewing parachute of this invention deploys to support the parachutist and permits controlled descent of the parachutist to the ground.

In one embodiment of this invention, the glidewing clothlike material has a weave such that the dynamic conditions of the atmosphere interacting with the glidewing in flight cause air to pass through the fabric and inflate that portion of the module defined by the canopy, the leading edge, and the folded-back portion. Inflation of this portion of the module may also be accomplished by means of one or more apertures disposed in the arcuate leading edge.

According to a preferred embodiment of this invention, the above-referred-to leading edge apertures may be constructed as one-way valves which permit air to pass from the atmosphere through the arcuate leading edge but will inhibit air from escaping to the atmosphere from behind the arcuate leading edge.

According to another embodiment of this invention, a flexible, clothlike, airfoil, cambered fully collapsible glidewing parachute has an arcuate leading edge which, together with the canopy and a folded-back and attached portion, forms the airfoil configuration referred to above. The airfoil has at least one aperture therein in a portion thereof other than the leading edge, preferably at or near the point or line where the folded-back portion is attached to the canopy. In fact, under some conditions this aperture may be formed in the attachment of the folded-back portion to the canopy. In a preferred aspect of this embodiment of this invention the non-leading edge aperture is provided as a one-way valve permitting air to enter from the atmosphere but prohibiting escape of air to the atmosphere under flight conditions.

The parachute of this invention is not a pneumatically inflatable device such as an automobile tire and is not "filled" with an airpump or other source of compressed air. This parachute is completely limp and collapsible under nonflight conditions. The parachute of this invention is designed and especially constructed to take advantage of the dynamics of flight and the balance of air pressures about an airfoil during flight to cause ambient atmospheric air to inflate and render arcuate the leading edge of the parachute and maintain such in an arcuate condition during flight while in no way impeding the full collapsibility and total clothlike limpness thereof when not under flight conditions.

Understanding of this invention will be facilitated by reference to the accompanying drawing in which:

FIG. 1 is an isometric view of a portion of a glidewing parachute made up of modules, each having a leading edge according to this invention;

FIG. 2 is a sectional view through a portion of the leading edge of the parachute of FIG. 1;

FIG. 2a is a plan view of one parachute panel adapted to use in this invention;

FIG. 3 is a sectional view similar to FIG. 2 showing a modified leading edge according to this invention;

FIG. 3a is a bottom view of the leading edge configuration of FIG. 3;

FIG. 4 is a sectional view similar to FIGS. 2 and 3 showing a further modified leading edge configuration according to this invention;

FIG. 5 is a sectional view of a portion of a parachute leading edge according to this invention;

FIG. 6 is a sectional view of a parachute cross section similar to FIG. 5;

FIG. 7 is a front elevation of a portion of the leading edge of a parachute according to this invention;

FIG. 8 is a bottom view of a portion of the leading edge of a parachute similar to that shown in cross section in FIG. 2;

FIG. 9 shows a portion of a clothlike airfoil parachute canopy similar to that shown in FIG. 7 which contains a one-way valve behind an aperture in the leading edge thereof;

FIG. 10 is a cross section along the line 10–10 in FIG. 9 looking in the direction of the arrows;

FIG. 11 shows a portion of a clothlike airfoil parachute canopy similar to the canopy shown in FIG. 9, containing a one-way valve in the leading edge of the airfoil and a one-way valve in the underside of the airfoil adjacent the place of attachment of such underside to the canopy surface;

FIG. 12 is a section taken along the line 12–12 in FIG. 13; and

FIG. 13 is an isometric view of a portion of a clothlike airfoil glidewing parachute made up of at least three modules having one-way valves both in the arcuate leading edges thereof and in the underside of the airfoil.

As used in this application, the term "clothlike" refers not only to the material of which the canopy of the parachute described herein is made, but also characterizes the physical structure of such canopy in that it requires that such canopy be foldable when not in flight to a condition of such complete compactness that it can be carried on the back of a parachutist with no greater inconvenience and discomfort than a conventional circular parachute. It further should be noted that the term "flexible" as used herein is intended to mean flexibility in the cloth or plastic film sense and is not intended to embrace the flexibility of a steel spring or aluminum airplane skin. Thus, it should be understood that the canopy described and claimed in this application has all the attributes of packability and transportability as conventional parachutes.

Further, it should be understood that the term "inflation" as used herein refers to the development of a parachute in flight and the structural relationship thereof when acted upon by the balance of forces in flight, and does not refer to inflation of a pneumatic device in the sense of an automobile tire innertube being inflated.

The glidewing parachutes of this invention may be made of one or more modules. These modules are each suitably spanwise sections which are joined together along a chord to form a complete parachute. The suspension lines may depend from the chord juncture lines and may comprise a multiplicity of fore to aft spaced lines. According to a prior patent of the instant applicant the suspension or load lines may be joined to the canopy through catenary or substantially catenary connections. In some instances one module may constitute the entire parachute. In other instances two, three or more modules can be joined together. Where more than one module are joined together, less than all of them, but at least one, may have an arcuate leading edge with or without the above described apertures therein.

According to this invention, it has been found that the performance of flexible wing gliding parachutes is markedly improved by providing the leading edges thereof in an arcuate form both with relation to the periphery of the device and the cross section of the leading edge thereof. The general arcuate form of a parachute leading edge with respect to the periphery of the parachute is often an inherent function of the nature and structure of substantially any parachute. Thus, the combination of the lifting forces on the parachute transmitted through the shroud and load lines often causes the leading edge to "buckle" into an arcuate shape (spanwise chamber) at least along a portion of the leading edge and canopy thereof. See, for example, the shape of the leading edge 22 of the parachute of Buhler, U.S. Pat. No. 2,959,385. This substantially inherent arcuate form is distinguished from the leading edge structure of this invention in that this invention is directed to a parachute leading edge which is arcuate in cross section. Each section transversely taken through a leading edge of a parachute according to this invention is arcuate. In some cases, this arc may be a segment of a circle and in other cases, this arc may be a section of some other substantially smooth nonlinear geometric function. Further, according to this invention, this leading edge which is arcuate in cross section may be, and usually is, additionally longitudinally arcuate along the leading edge length.

It is within the scope of this invention to provide the leading edge cross section curvature in any manner considered desirable under the circumstances. For example, FIG. 2a shows an illustrative panel for use in a parachute according to this invention. It can be seen that, if the panel 1 has sides 1a and 1b with the base 2 provided in a convex configuration, when the panel is incorporated into a parachute and the base 2 curled back under the remainder of the panel, for example, along a line 3, the ends 4 and 5 of the base can be affixed to the sides 1a and 1b, respectively, so as to provide a loose arcuate shape as is better seen in FIG. 1. This same mode of construction is also seen in FIG. 8 where an underside view of three panels joined together is shown. It should be noted that in this embodiment of this invention the material of the leading edge is folded back but is not fully joined to the canopy along its entire length, whereby a generally closed section of a toroid would result, but rather that only portions of the clothlike material of the leading edge of the parachute canopy is joined to the canopy at intervals to form a generally open arcuate section having spaced points at which the arc is closed, e.g., at 4 and 5 of FIG. 8.

It is preferred in this embodiment of this invention to provide the convex base 2 of the panel 1 in a substantially catenary shape so as to efficiently distribute the stresses therealong. The catenary shaped base edge may be reinforced if desired. This may be accomplished, for example, by rolling the edge and joining the rolled edge to itself to form a sort of welting alone or a line may be joined to the edge to reinforce it. Further, the base edge may be rolled into a hollow structure and a reinforcing line inserted therethrough.

In another embodiment of this invention, the leading edge of the parachute can have a series of cross sections wherein each, or at least most, are in a closed arcuate shape. For example, reference is made to FIGS. 2 and 3a, wherein there is shown a series of panels 10 having a leading edge 11 which is arcuate in shape and formed by loosely folding a portion 12 of each panel back and joining this folded portion to the canopy along a line 13. While this line 13 can be positioned substantially anywhere along the panel, it has been found to be particularly desirable to position in about halfway along the length of each panel and to make it a generally smooth line from panel to panel. In the case of glide types of flexible wings, there is both a leading and a trailing edge. In these constructions, it has been found desirable to provide the joining line intermediate between the leading and trailing edge of the wing. It has been found suitable to provide the point of juncture at a distance from the leading edge spaced therefrom at least about 10 percent of the total distance between the leading edge and the other edge of the canopy of wing, preferably about 30 to 70 percent of this distance.

It is a further embodiment of this invention to provide a parachute, and in particular, a flexible glide wing or flexible rotor, in the shape of an airfoil. This may be accomplished, as envisioned by this invention, by carrying the folded back portion of the leading edge all the way to the trailing edge of the flexible structure. In FIG. 4 the glidewing, or rotor top surface 20, is provided with an arcuate leading edge 21, the underside 22 of which is joined in a substantially non-arcuate manner to the trailing edge 23.

It is within the scope of this invention to provide and retain the arcuate configuration of the parachute leading edge during flight in any manner and by any means considered desirable under the circumstances of construction and operation prevailing. For example, by properly positioning and dimensioning the various portions of the flexible clothlike material making up the leading edge, it is possible and practical to make use of the balance of flow pressures acting on the parachute in flight to maintain the leading edge in an arcuate configuration. This, of course, may be the simplest means for accomplishing this desired result. There are instances, however, when it is necessary or desirable to provide the leading edge, and in fact the entire canopy, so structured that it is not possible to take full advantage of the balance of flow pressures to maintain the leading edge in a proper arcuate position and configuration during flight. Under these circumstances, it has been found to be desirable to provide some auxiliary means to produce and maintain the arcuate shape of the leading edge.

According to this invention, it has been found that it is possible to employ a rib within the arcuate leading edge. As shown in FIG. 3, a leading edge 30 is maintained in its proper arcuate position by means of a rib 31 positioned between the canopy 32 and the underside 33 of the leading edge. As shown in this FIG. 5, the leading edge may be constructed in a manner similar to that shown in FIG. 2 with the rib 31 provided along a chord line and filling out the entire leading edge, but only a portion of the entire space enclosed by the canopy and underside of the leading edge.

Further, as shown in FIG. 6, a reinforcing rib 40 may occupy the entire space enclosed by the canopy 41 and the underside 43 from the leading edge 42 to the point or line of juncture 44.

It has been found desirable in many glidewing constructions, to utilize reinforcing ribs within the arcuate leading edge and/or the entire airfoil construction thereof to maintain the design configuration and prevent the arcuate leading edge from unduly expanding due to flow pressures, depending upon the design configuration and its relationship to the flow pressures encountered in flight. It has often been found to be most necessary and desirable to prevent the arcuate leading edge and/or airfoil from expanding out of its design shape. In this embodiment of the invention, the rib is made up of a flexible clothlike material, suitably a textile and preferably the same material as used for the canopy itself. It may be desirable to provide a semistiff rib, according to this invention. It is preferred, however, to design the arcuate leading edge and/or airfoil such that the balance of the flow pressures tends to expand the arcuate leading edge and/or the airfoil and thus to use a flexible clothlike rib.

It is within the scope of this invention to provide ribs, where such are used, at points along the arcuate leading edge and/or airfoil which are intermediate the suspension lines extending from the parachute canopy. Additionally, there may be provided ribs at the point where one or more suspension lines are joined to the canopy.

It is within the scope of this invention to utilize reinforcing members within the arcuate leading edge which are not considered as ribs. For example, semistiff spars can be used in place of or in addition to ribs.

In a still further embodiment of this invention, it has been found that the arcuate shape of the leading edge of a flexible parachute can be maintained in a most simple and expedient manner. It has been found that if small apertures are provided at spaced points, possibly along the stagnation line of the leading edge, air passing the leading edge tends to enter through these apertures into the space defined by the leading edge, the canopy surface and the folded back portion, thereby causing these members to be filled out or expanded to their restraining dimensions and thereby provide and maintain the proper arcuate leading edge shape. While the described apertures may be provided at the stagnation point or line of stagnation points of the leading edge in order to maximize the effect of air pressure into the space behind the leading edge as defined above, it is not necessary or essential that these apertures are so positioned. It is within the spirit and scope of this invention to provide these apertures anywhere along the leading edge or adjacent members of the parachute so as to communicate the external air with the space behind the leading edge as defined. Further, it is preferred that the space behind the leading edge as defined above is substantially enclosed by the members recited. Again, this is not an absolutely essential requirement since this embodiment can be used with a leading edge structure such as shown in FIGS. 2 and 3.

Referring to FIG. 7, there is shown this embodiment of this invention where apertures 50 are provided in the arcuate leading edge 51 of a flexible parachute having a canopy 52, and underside 53, and a trailing edge 54.

It is preferred in the practice of this aspect of this invention, where apertures are provided in the arcuate leading edge, to size these apertures substantially smaller than the distance between suspension lines where such join the canopy. Thus, it is preferred that the arcuate leading edge is a substantially continuous material, preferably textile fabric, which has relatively small apertures therein. It is most preferred that these apertures are discontinuous and may even be widely separated. Certainly, the aperture cross-sectional area is less than the area of the fabric constituting the frontal portion of the arcuate leading edge.

A still further embodiment of this application, as depicted particularly in FIGS. 9 and 10 of the drawing attached hereto, involves the provision of an arcuate leading edge containing clothlike airfoil shaped parachute, having at least one aperture disposed in a minor portion of the arcuate leading edge. This aperture suitably has hingedly affixed to the inner side thereof at least one clothlike flap so constructed and arranged as to be at least slightly larger than the aperture to which it is related and so positioned as to be able to completely close off such aperture.

Referring now to FIGS. 9 and 10, there is seen a canopy having an arcuate leading edge 51. Located in this arcuate leading edge 51 are several apertures (only one is shown for simplicity) 50, and stitched to the inside of the leading edge, as shown at 55, is a band of clothlike material 56 which preferably bisects the aperture. Attached to this band 56 are two clothlike flaps 57 and 58. Each of these flaps is preferably sewn at 59 and 60 respectively to the band along one edge thereof only, so as to form a hinged connection. Each flap is larger in circumference than the portion of the aperture adjacent thereto.

It should be understood that it is within the scope of this invention to provide the clothlike flap type one-way valve attached to the periphery of the aperture without the necessity of providing the clothlike band bisecting such. Where this latter embodiment is used, it is preferred to hingedly sew the flap to that portion of the aperture periphery closest to the canopy so that gravity will aid in keeping the flap closed, whereby preventing the escape of air entrapped behind the arcuate leading edge.

The use of apertures and associated clothlike one-way valves is most preferable in connection with totally clothlike airfoil structures. This construction, however, can also be used with other types of airfoil structures as desired. It is preferred in the practice of this invention that the apertures having the one-way valves mounted therewith be present along the entire length of the arcuate leading edge, and that a multiplicity of these apertures be present, spaced equally or unequally from each other.

A still further aspect of this invention is shown in FIGS. 11 and 12. Consideration of these views will indicate the that there is provided a one-way valve structure, similar to that shown and described with respect to FIGS. 9 and 10, on the underside of the airfoil. In this embodiment of this invention 18c the underside 60 is provided with at least one aperture 61, having a one-way valve flap 62 attached to the inside of the underside 60, preferably by means of stitching 63. This attachment is made in such a manner that the flap is hingedly connected to the underside of the airfoil.

In operation, the use of two flaps enables air to penetrate into the space between the canopy and the underside thereof, but prevents such air from escaping, except where the airfoil approaches stall conditions, whereupon the balance of aerodynamic forces will cause the valve on the underside of the airfoil to open and permit air to enter both from the leading edge and from the underside, whereby to tend to stabilize the parachute and permit it to continue in flight.

One particularly preferred construction for the aperture rearwardly positioned in the airfoil glidewing of this invention utilizes the folded-back portion of the arcuate leading edge as the valve-aperture means. In this construction, the folded-back portion has a rearward terminal flap which is inwardly folded at the place where the folded-back member is attached to the canopy. The attachments are at spaced intervals with gaps between. These gaps act as apertures with the folded-in flap acting as a one-way valve member.

Referring now to FIGS. 12 and 13, a glidewing having three modules 60a, 60b, and 60c has canopies 61a, 61b, and 61c, each of which has an arcuate leading edge 62a, 62b, and 62c, and a folded back portion 63a, 63b, and 63c, which have afterward flaps 64a, 64b and 64c. There are provided apertures 65 in the arcuate leading edges and a rib 66. The folded-under portion is attached at spaced points 68 to the canopy. The modules are suitably joined along chords, at 69 and 70, with suspension lines 71 extending therefrom.

It should be noted that the structures of the valves depicted in the accompanying drawing in the leading edge and in the underside are shown as two different constructions. It should be understood that the same or different constructions can be used for each valve and that either of the constructions shown may be used for either or both valves. While the shown constructions are preferred, any other particularly desirable one-way valve structure can be used with equivalent effect.

It has been noted above that the arcuate leading edge described herein is formed by folding the forward portion of the canopy back and attaching such to itself either on the underside or on top thereof. It will be appreciated that it is entirely within the scope of this invention to provide a separate clothlike member as the arcuate leading edge and to attach such member both to the forward portion of the canopy and to a rearward portion thereof. It will be clear that it is relatively immaterial whether a single clothlike member is used for the canopy and the leading edge and the underside of the airfoil (if such underside is used), or if separate and distinct clothlike members are used for each of these parts suitably joined together to effectuate the purposes thereof.

I claim:

1. A flexible airfoil glidewing parachute made up of clothlike material, foldable into compact form when not in use, and deployable when airborne into a glidewing shape, comprising at least one module, which module comprises a clothlike canopy and a multiplicity of suspension lines depending therefrom, said canopy having a leading edge, a trailing edge, and lateral sides wherein said leading edge is the forwardmost portion of said parachute; wherein said leading edge is clothlike and contiguous with said canopy and is a member which is folded back from the forward portion of said canopy toward said trailing edge and is secured to said canopy whereby to define a hollow space between said canopy, said leading edge, and said clothlike folded-back member; wherein at least said leading edge has opening means therein to permit atmospheric air to pass through at least part thereof into said space during free flight thereby, inflating said space into an airfoil like shape and causing said leading edge to inflate into an arcuate cross section along at least a portion of the length thereof during such free flight.

2. A glidewing as claimed in claim 1 wherein said opening means comprises at least one aperture.

3. A glidewing as claimed in claim 2 having a multiplicity of apertures in the arcuate leading edge thereof.

4. A flexible glidewing parachute as claimed in claim 2 wherein said aperture has a one-way valve on the inside thereof permitting air to penetrate through said leading edge to behind such edge but inhibiting air from escaping from behind said leading edge.

5. A flexible glidewing parachute as claimed in claim 4 wherein said one-way valve means comprises a clothlike strip across said aperture and clothlike flap means hingedly attached to said strip, which flap means is of larger area than said aperture.

6. A flexible glidewing parachute as claimed in claim 4 wherein said one-way valve means comprises a clothlike strip across said aperture and two clothlike strips, each hingedly attached to opposite sides of said strip.

7. A glidewing as claimed in claim 2 including a clothlike flap in said space hingedly attached to the sidewall about a portion of said aperture adapted to permit atmospheric air to enter into said space but substantially preventing air from escaping from said space to the atmosphere during flight.

8. A flexible glidewing parachute as claimed in claim 2 wherein said folded-back portion has a one-way valved aperture therein adjacent the place where said folded-back portion is joined to said canopy.

9. A glidewing as claimed in claim 1 including at least one shape-retaining member in said space.

10. A glidewing as claimed in claim 9 wherein said folded-back member is secured to said canopy through said shape-retaining member.

11. A glidewing as claimed in claim 9 wherein said folded-back member has a forwardly directed flap extending from the aftmost portion thereof directed into said space, and wherein said folded-back member is secured to said canopy through said shape-retaining member at least at said aftmost portion thereof.

12. A glidewing as claimed in claim 1 wherein said folded-back member is directly secured to said canopy aft of said leading edge.

13. A glide wing as claimed in claim 1 wherein a said folded-back member has a forwardly directed flap extending from the aftmost portion thereof directed into said space, and wherein said folded-back member is secured to said canopy at spaced points along said aftmost portion thereof.

14. A glidewing as claimed in claim 13 having apertures between said points where said folded-back member is secured to said canopy.

15. A glidewing as claimed in claim 1 comprising a multiplicity of modules joined together along corresponding chords thereof.

16. A glidewing as claimed in claim 1 wherein said module is substantially three-sided in plan shape.

17. A glidewing as claimed in claim 1 wherein said canopy, leading edge, and folded-back member are all a single sheet of clothlike material.

18. A glidewing as claimed in claim 1 wherein said suspension lines are at least partially dependent from said lateral sides.

19. A glidewing as claimed in claim 1 wherein said folded-back member extends to said trailing edge.

20. A glidewing as claimed in claim 1 wherein said folded-back member extends aft about 30 to 70 percent of the total distance from said leading edge to said trailing edge.

21. A flexible glidewing parachute as claimed in claim 1 wherein said arcuate leading edge extends substantially along the whole of the length of the leading edge of one of said modules.

Barish 202.1 CIP

PO-1050
(5/69)

UNITED STATES PATENT OFFICE
CERTIFICATE OF CORRECTION

Patent No. __3,558,087__  Dated __January 26, 1971__

Inventor(s) __David T. Barish__

It is certified that error appears in the above-identified patent and that said Letters Patent are hereby corrected as shown below:

Column 1, line 13, after "canopy" insert a period, followed b

-- This invention relates to parachutes. It more par ticularly refers to parachutes of the glide-wing type and especially to improvements therein.

This specification describes a parachute having an arcuate-shaped edge.

Many types of parachutes are quite well known. Am the most common of all parachutes is the relatively conventior round type whose function is principally to slow the descent of a person or object falling from an airplane or other atmos pheric vehicle. This conventional type of parachute has a limited lateral mobility and controllability during descent.

More recently, there have been developed various wing devices which have much in common with conventionally shaped parachutes, in that their principal purpose is to reduce the rate of descent of an object or person falling from an atmospheric vehicle, but exhibit many improvements over suc round parachute in the ability to glide in a relatively horizontal direction. Further, these flexible wing devices are extremely maneuverable and directionally controllable.

It has been the usual practice in the past to provide all parachutes, of any size, shape, or purpose, as a generally curved surface with the curvature being directed away from the ground. Thus, lifting forces, or at least descent-restraining forces, are provided, whether by reason of air passing over the curved surface in a direction generally parallel thereto or by reason of air becoming stagnant in the concave side of the--

Page 2

PO-1050
(5/69)

UNITED STATES PATENT OFFICE
CERTIFICATE OF CORRECTION

Patent No. 3,558,087  Dated January 26, 1971

Inventor(x) David T. Barish

It is certified that error appears in the above-identified patent and that said Letters Patent are hereby corrected as shown below:

Column 3, line 75, "in" should be corrected to --it--

Column 4, line 9, "of", second occurrence, should read -- or --.

Column 6, line 11, "the" after "indicate" should be deleted.

Column 6, line 14, Delete "18c"

Column 7, line 10, Delete the comma.

Signed and sealed this 3rd day of August 1971.

(SEAL)
Attest:

EDWARD M. FLETCHER, JR.
Attesting Officer

WILLIAM E. SCHUYLER, JR.
Commissioner of Patents